March 22, 1960    M. CODELL ET AL    2,929,686
PURIFICATION OF BROMINE
Filed Aug. 8, 1958
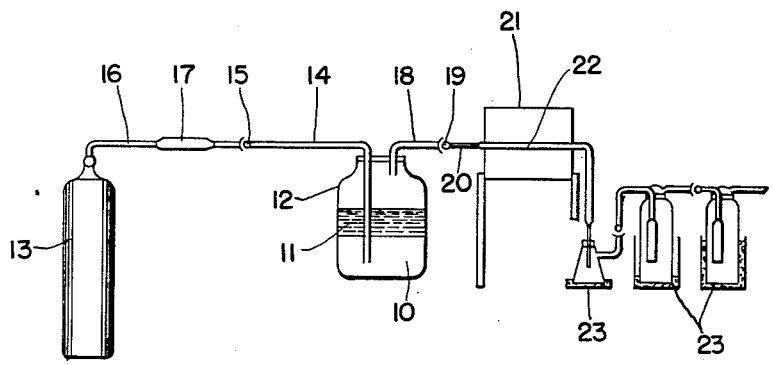
INVENTOR.
MAURICE CODELL
GEORGE NORWITZ
BY
S. Joseph Rotondi, Jr., A. J. Dupont &
H. R. Johns

United States Patent Office 2,929,686
Patented Mar. 22, 1960

2,929,686

PURIFICATION OF BROMINE

Maurice Codell and George Norwitz, Philadelphia, Pa., assignors to the United States of America as represented by the Secretary of the Army Application August 8, 1958, Serial No. 754,119

1 Claim. (Cl. 23—216)

(Granted under Title 35, U.S. Code (1952), sec. 266)

The invention described herein may be manufactured and used by or for the Government for governmental purposes without the payment of any royalty thereon.

This invention relates to the purification of bromine and more especially to a means and a method for eliminating carbon compounds and other contaminants from bromine.

For many purposes, it is necessary to have bromine that contains no organic compounds. Practically, all commercial bromine contains some organic contaminants. The chief source of these contaminants is the organic material contained in the brines, bitterns, sea water, and salts from which the bromine is derived. Other less important sources of contamination are the coal tar used in the joints of the brine tanks, dust from the air, and the paraffin or grease used to seal the stoppers. Among the carbon compound contaminants heretofore identified are chloroform, bromodichloromethane, ethylchlorobromide, bromoform, carbon tetrabromide, dibromochloromethane, and cyanogen.

Various methods for removing these contaminants have been proposed. None of them, however, have proved to be altogether satisfactory, either because they are wasteful and expensive, or because they fail to remove all the contaminants. The present invention overcomes these difficulties by the provision of an improved method which is more effective than those heretofore proposed.

The invention will be better understood from the following description when considered in connection with the accompanying drawing, and its scope is indicated by the appended claim.

In accordance with the invention, the bromine (indicated in the drawing by a reference numeral 10) is first mixed with sulphuric acid 11 in a container 12 to remove the water and some of the organic compounds. The container is connected to an oxygen tank 13 through a tube 14, a ball joint 15 and a tube 16 containing a drying agent 17. The container is then heated in a water bath to a temperature of 30° C. and oxygen is bubbled through the bromine-sulphuric acid mixture.

The resultant mixture of bromine vapor and oxygen is passed through a tube 18, a ball joint 19 and a tube 20 which is heated by a heater 21 to 1000° C. It should be noted that the tube 20 is packed with fragmented quartz glass or Vycor glass 22 to ensure a large heating surface. Vycor glass is one which is about 96% silica. The effect of this heating is to oxidize the carbon compounds to carbon dioxide.

From the tube 20, the residue is passed through Dry Ice traps 23 which function to freeze out the bromine. After this, the bromine is allowed to melt and is shaken with sulfuric acid to remove the water formed by the oxidation of the hydrocarbons. The bromine layer is then separated from the sulphuric acid layer and distilled according to standard practice.

In connection with the above-described apparatus, it is essential that all parts which come into contact with bromine be made of glass. No grease may be used on the joints, and no alcohol or acetone may be used with the Dry Ice. Observing these precautions, the above-described process has been found to be trouble-free and inexpensive. It involves no waste for the reason that all residues can be returned to the purification container 12 for further treatment.

While the above-described process is designed primarily to eliminate organic impurities, it also eliminates sulphur compounds such as sulphur bromide and thionyl bromide which are oxidized to sulphur dioxide or sulphur trioxide in the heated tube. Also it is probable that this process functions to eliminate hydrobromic acid by oxidizing it to water and bromine, and to eliminate chlorine which is less likely to be frozen out than bromine.

We claim:

The method of eliminating carbon compounds from bromine which includes forming a mixture of said bromine and sulphuric acid, heating said mixture to a temperature of the order of 30° C. bubbling oxygen through said mixture to produce bromine vapor and oxygen, heating said vapor and oxygen to a temperature of the order of 1000° C. to produce a residue substantially free of said carbon compounds, freezing the bromine out of said residue, melting said bromine, and intermixing said bromine with sulphuric acid to remove the water formed by the oxidation of said carbon compounds.

References Cited in the file of this patent

Mellor: "A Comprehensive Treatise on Inorganic and Theoretical Chemistry," Longmans, Green and Co., vol. 2 (1922), page 40, and Supplement 2, part 1 (1956), page 692.